United States Patent [19]
Hishinuma

[11] Patent Number: 5,260,873
[45] Date of Patent: Nov. 9, 1993

[54] MEDICAL IMAGE DISPLAYING APPARATUS

[75] Inventor: Kazuhiro Hishinuma, Kanagawa, Japan

[73] Assignee: Fuji Photo Film Co., Ltd., Kanagawa, Japan

[21] Appl. No.: 509,847

[22] Filed: Apr. 17, 1990

[30] Foreign Application Priority Data

Apr. 18, 1989 [JP] Japan .................... 1-97810

[51] Int. Cl.⁵ .................................... G06F 15/68
[52] U.S. Cl. ..................... 364/413.22; 364/413.19; 364/413.13; 358/164; 358/166; 358/96; 358/169; 358/393; 395/128; 395/129; 395/130; 395/131; 345/11; 345/150
[58] Field of Search ............. 364/413.22, 413.19, 364/413.13; 358/164, 166, 96, 169, 133; 395/128, 129, 130, 131, 132; 340/703, 793

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato e4t al. | 192/358 |
| 4,315,318 | 2/1982 | Kato et al. | 382/16 |
| 4,387,428 | 6/1983 | Ishida et al. | 364/413.13 |
| 4,899,216 | 2/1990 | Tatsumi et al. | 358/80 |
| 5,048,110 | 9/1991 | Nakajima | 382/54 |
| 5,060,060 | 10/1991 | Udagawa et al. | 358/80 |
| 5,083,257 | 1/1992 | Kennedy | 395/131 |
| 5,148,289 | 9/1992 | Nishiyama et al. | 358/300 |

FOREIGN PATENT DOCUMENTS 56-11395 2/1981 Japan .

Primary Examiner—Roy N. Envall, Jr.
Assistant Examiner—Gita D. Shingala
Attorney, Agent, or Firm—Sughrue, Mion, Zinn, Macpeak & Seas

[57] ABSTRACT

A medical image displaying apparatus is provided with a display device, which reproduces a visible image from an image signal made up of a series of image signal components representing a medical image, and which displays the visible image. A conversion device receives a plurality of primary image signal components representing a medical image, each of the primary image signal components being composed of n bits, and converts them into a plurality of secondary image signal components representing an image with a desired gradation and having been compensated for gradation characteristics of the display device. Each of the secondary image signal components is composed of n+k bits, where k>0. The display device reproduces a visible image from the plurality of the secondary image signal components and displays it.

4 Claims, 3 Drawing Sheets

F I G. 2A
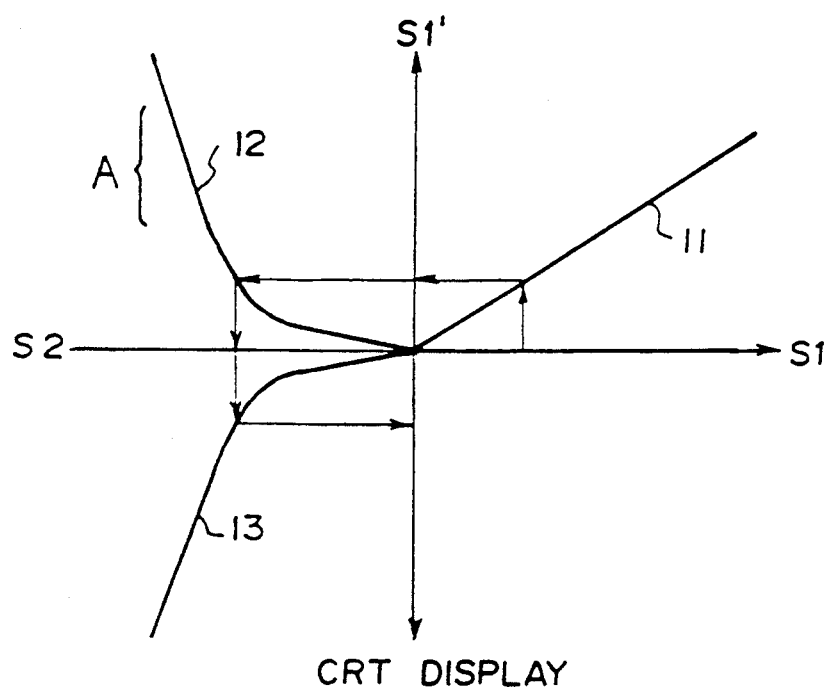
CRT DISPLAY
F I G. 2B
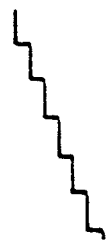
F I G. 2C

MEDICAL IMAGE DISPLAYING APPARATUS

BACKGROUND OF THE INVENTION

1. Field of the Invention

This invention relates to a medical image displaying apparatus for reproducing a medical image, which has been recorded during the recording of an X-ray and displaying it.

2. Description of the Prior Art

Systems have heretofore been used widely wherein image signals representing medical images are obtained with the X-ray CT, the MRI, or the like, and the medical images are reproduced as visible images from the image signals and displayed on image display devices, such as CRT display devices.

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. As a result, a medical radiation image of the object is stored on the stimulable phosphor sheet. The stimulable phosphor sheet is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the medical radiation image of the object as a visible image on a display device, such as a cathode ray tube (CRT).

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a medical radiation image as a visible image on an image display device, such as a CRT.

In the radiation image recording and reproducing systems described above, before an image is reproduced from an image signal and displayed on a CRT display device, or the like, gradation conversion processing is carried out in accordance with a look-up table (LUT), or the like, on the image signal such that a visible image having a desired gradation can be obtained. A visible image is then reproduced from the processed image signal and displayed.

However, a CRT display device, or the like, has characteristics which are very nonlinear, so that the visual brightness (image density) of a visible image displayed thereon is not proportional to the image signal fed thereinto. Therefore, even if the gradation conversion processing is carried out on an image signal and a visible image is reproduced from the processed image signal, a visible image having a desired gradation cannot be displayed on the CRT display device, or the like.

In order for the aforesaid problems to be eliminated, the nonlinear characteristics of an image display device may be found and taken into consideration when an image signal is converted in accordance with a LUT, or the like, so that a visible image having a desired gradation can be reproduced from the converted image signal and displayed on the image display device. With this technique, a visible image having a desired gradation can be displayed. However, a CRT display device, or the like, has the characteristics which are considerably nonlinear. Therefore, the problem occurs in that an image region, in which the image density changes continuously and smoothly, is displayed as an image having step-like changes in the image density, i.e. striped artifacts appear on the visible image. Such a visible image is not suitable for medical diagnoses.

SUMMARY OF THE INVENTION

The primary object of the present invention is to provide a medical image displaying apparatus wherein nonlinear characteristics of an image display device are accurately compensated for, and a visible image having good image quality and a desired gradation is reproduced and displayed.

Another object of the present invention is to provide a medical image displaying apparatus wherein a visible image having good image quality and a desired gradation is reproduced and displayed. and wherein the capacity of storage of an image signal from which the visible image is reproduced is kept small.

The present invention provides a medical image displaying apparatus provided with a display means, which reproduces a visible image from an image signal made up of a series of image signal components representing a medical image, and which displays the visible image, the medical image displaying apparatus comprising a conversion means, which receives a plurality of primary image signal components representing a medical image, each of said primary image signal components being composed of n bits, and which converts said primary image signal components into a plurality of secondary image signal components representing an image with a desired gradation and having been compensated for gradation characteristics of said display means, each of said secondary image signal components being composed of n+k bits, where k>0, wherein said display means reproduces a visible image from the plurality of said secondary image signal components and displays the visible image.

Ordinarily, in a single system, n bits (for example, 8 bits) are allocated to each of image signal components of an image signal, and the n-bit image signal components are subjected to various processes. However, even if each of the image signal components can be expressed with n bits, nonlinear characteristics of an image display device, such as a CRT display device, cannot be accurately compensated for with such an amount of information.

In order for the nonlinear characteristics of the image display device to be compensated for accurately, a larger amount of information, for example, n+k bits, where k>0, e.g. 10 bits, may be allocated to each of the image signal components. However, the amounts of image signals representing medical images are very large. Therefore, in a system wherein a large number of image signals are processed, if such a large amount of information is allocated to each of the image signal components of an image signal, a very large capacity of storage will be required for the image signals to be stored.

The medical image displaying apparatus in accordance with the present invention is provided with the conversion means, which receives a plurality of primary image signal components representing a medical image, each of the primary image signal components being composed of n bits. The conversion means converts the primary image signal components into a plurality of secondary image signal components, which represent an image with a desired gradation and which have been compensated for gradation characteristics of the display means. Each of the secondary image signal components is composed of n+k bits, where k>0. The display means reproduces a visible image from the plurality of the secondary image signal components and displays the visible image. Therefore, with the medical image displaying apparatus in accordance with the present invention, a visible image can be reproduced and displayed which has been accurately compensated for the nonlinear characteristics of the display means, which has a desired gradation, and which is suitable for diagnostic purposes. Also, because each of the image signal components before being converted by the conversion means (i.e. the primary image signal components) is composed of n bits, the capacity of storage of image signals can be kept small.

BRIEF DESCRIPTION OF THE DRAWINGS

FIG. 2A is a graph showing how the image signal components are converted, FIG. 2B is an explanatory view showing part of curve representing the characteristics of a conversion table for obtaining the secondary image signal components S2 each of which is expressed with 8 bits, FIG. 2C is an explanatory view showing part of curve representing the characteristics of a conversion table for obtaining the secondary image signal components S2 each of which is expressed with 10 bits.

DESCRIPTION OF THE PREFERRED EMBODIMENTS

The present invention will hereinbelow be described in further detail with reference to the accompanying drawings.

Figure 1:
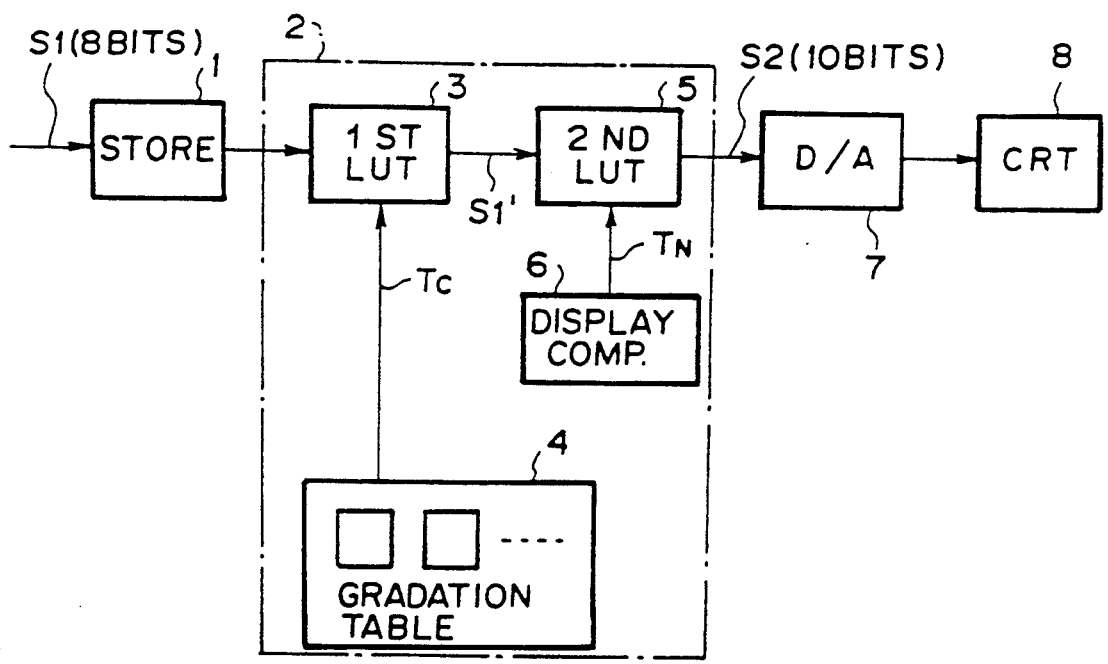
FIG. 1 is a block diagram showing an embodiment of the medical image displaying apparatus in accordance with the present invention.

FIG. 1 is a block diagram showing an embodiment of the medical image displaying apparatus in accordance with the present invention.

With reference to FIG. 1, a plurality of primary image signal components S1, which represent a medical image and each of which is composed of 8 bits, are fed into the medical image displaying apparatus. The primary image signal components S1 are stored in a storage means 1. After the primary image signal components S1 representing a single image are stored in the storage means 1, they are fed into a first LUT unit 3 of a conversion means 2.

A gradation table storage unit 4 stores information about a plurality of gradation tables which are to be used during the conversion of the primary image signal components S1 into image signal components representing various levels of gradation. A gradation table TC, which corresponds to a visible image having a desired gradation and which is designated by an operator of the medical image displaying apparatus, is selected from among the plurality of the gradation tables, and the information about the gradation table TC is fed into the first LUT unit 3.

In accordance with the gradation table TC, the first LUT unit 3 converts the primary image signal components S1 into image signal components S1' which represent an image having a desired gradation. Like the primary image signal components S1, each of the image signal components S1' is constituted of 8-bit data. The image signal components S1' are fed into a second LUT unit 5.

A display compensation unit 6 stores information about a conversion table TN, which is used during the compensation for the nonlinear characteristics of a CRT display device 8 such that a visible image having a desired gradation can be reproduced and displayed on the CRT display device 8. The information about the conversion table TN is fed from the display compensation unit 6 into the second LUT unit 5.

The second LUT unit 5 convert the image signal components S1' in accordance with the conversion table TN. Specifically, the second LUT unit 5 converts the image signal components S1', each of which is composed of 8 bits, into secondary image signal components S2, each of which is composed of 10 bits, such that the nonlinear characteristics of the CRT display device 8 can be accurately compensated for. Because the conversion of the primary image signal components S1 into the secondary image signal components S2, each of which is composed of 10 bits, is carried out in this step, the nonlinear characteristics of the CRT display device 8 can be compensated for accurately, while the capacity of storage of the image signal (primary image signal components S1) is kept small.

The plurality of the secondary image signal components S2, each of which is composed of 10 bits, are fed from the second LUT unit 5 into a D/A converter 7 and converted thereby into analog image signal components. The analog image signal components are then fed into the CRT display device 8, which reproduces a visible image from the analog image signal components and displays it. In this manner, a visible image which has been compensated for the nonlinear characteristics of the CRT display device 8 and which has a desired gradation is displayed on the CRT display device 8.

FIG. 2A shows how the primary image signal components S1 are converted into the secondary image signal components S2.

The primary image signal components S1 fed into the first LUT unit 3 are converted thereby into the image signal components S1' in accordance with the gradation table TC having the characteristics indicated by the line 11 in FIG. 2A. The image signal components S1' are then fed into the second LUT unit 5. The second LUT unit 5 converts the image signal components S1' into the secondary image signal components S2 in accordance with the conversion table TN, which has the characteristics indicated by curve 12 in FIG. 2A for compensating for the nonlinear characteristics of the CRT display device 8. Each of the secondary image signal components S2 is constituted of 10-bit data, and therefore the nonlinear characteristics of the CRT display device 8 can be compensated for accurately. The secondary image signal components S2 are converted by the D/A converter 7 into analog image signal components, which are then fed into the CRT display device 8. The CRT display device 8 has the nonlinear characteristics, which is indicated by curve 13 in FIG. 2A corresponding to the reversed function of curve 12. Therefore, the visible image reproduced from the secondary image signal components S and displayed has been compensated for the nonlinear characteristics of the CRT display device 8 and has good image quality.

FIG. 2B is an enlarged view of the part A of curve 12 shown in FIG. 2A, which will be obtained if each of the secondary image signal components S2 is expressed with 8 bits. In general, a CRT display device has markedly nonlinear characteristics. Therefore, if the conversion table TN is designed to express each of the secondary image signal components S2 with 8 bits, the curve representing the characteristics of the conversion table TN will become step-like, and the nonlinear characteristics of the CRT display device 8 cannot be compensated for accurately. In other words, the signal S1' loses its 8-bit accuracy in this conversion process.

FIG. 2C is an enlarged view of the part A of curve 12 shown in FIG. 2A, which is obtained when each of the secondary image signal components S2 is expressed with 10 bits. Because a larger amount of data is allocated to each of the secondary image signal components S2, no step-like artifacts occur in the reproduced visible image.

Figure 3:
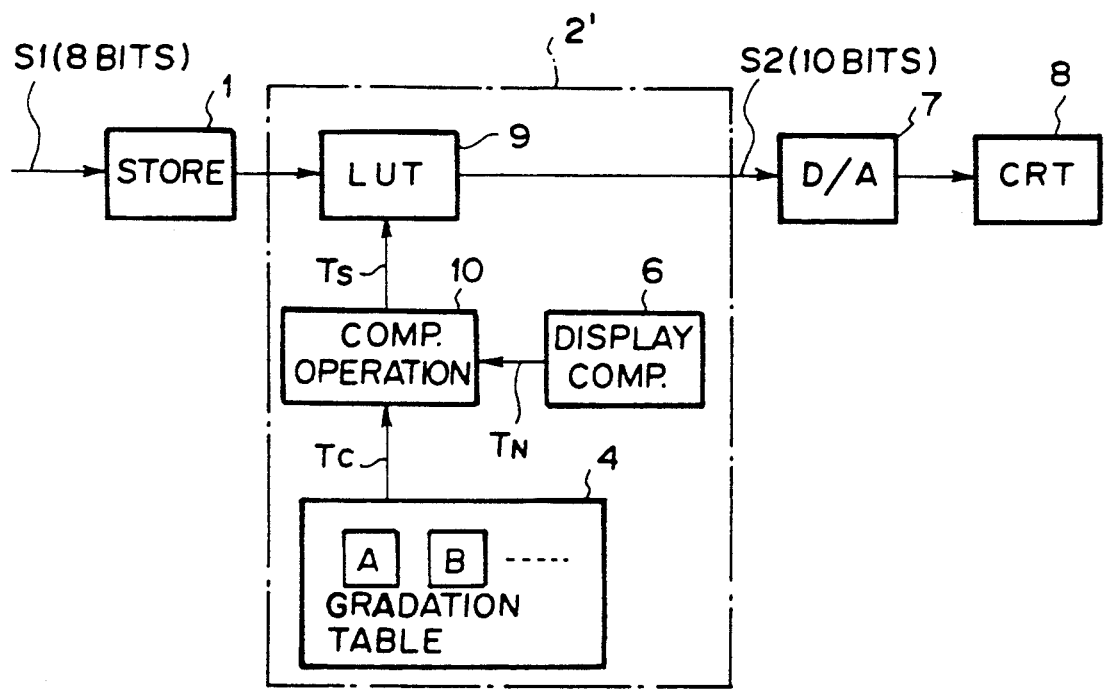
FIG. 3 is a block diagram showing another embodiment of the medical image displaying apparatus in accordance with the present invention.

FIG. 3 is a block diagram showing another embodiment of the medical image displaying apparatus in accordance with the present invention. In FIG. 3, similar elements are numbered with the same reference numerals with respect to FIG. 1.

With reference to FIG. 3, a conversion means 2' is provided with a compensation operating unit 10, which receives the information about the gradation table TC from the gradation table storage unit 4 and the information about the conversion table TN from the display compensation unit 6. The compensation operating unit 10 combines the gradation table TC and the conversion table TN with each other and generates a conversion table TS for converting the primary image signal components S1 directly into the secondary image signal components S2. Information about the conversion table TS is fed from the compensation operating unit 10 into a LUT unit 9. In accordance with the conversion table TS, the LUT unit 9 converts the primary image signal components S1, each of which is composed of 8 bits, into the secondary image signal components S2, each of which is composed of 10 bits. As in the embodiment shown in FIG. 1, the secondary image signal components S2 are fed into the D/A converter 7, which converts them into analog image signal components. The analog image signal components are then fed into the CRT display device 8, which reproduces a visible image from the analog image signal components and displays it. In this manner, a visible image which has a desired gradation and good image quality is reproduced from the analog image signal components and displayed on the CRT display device 8.

I claim:

1. A medical image displaying apparatus provided with a display means, which reproduces a visible image from an image signal made up of a series of image signal components representing a medical image, and which displays the visible image, the medical image displaying apparatus comprising a conversion means, which receives a plurality of primary image signal components representing a medical image, each of said primary image signal components being composed of n bits, and which first converts said primary image signal components into image signal components having a desired gradation and subsequently converts said image signal components having a desired gradation into a plurality of secondary image signal components representing an image with a desired gradation and having been compensated for gradation characteristics of said display means, each of said secondary image signal components being composed of $n+k$ bits, where $k>0$, wherein said display means reproduces a visible image from the plurality of said secondary image signal components and displays the visible image.

2. An apparatus as defined in claim 1 wherein said conversion means comprises:

i) a gradation table storage means which stores information about a plurality of gradation tables, ii) a display compensation means which stores information about a conversion table for the compensation for the gradation characteristics of said display means, iii) a first look-up table means which receives information about a gradation table from said gradation table storage means and receives said primary image signal components, and which uses said gradation table in order to convert said primary image signal components into image signal components representing an image having a desired gradation, and iv) a second look-up table means which receives information about said conversion table from said display compensation means and receives said image signal components representing an image having a desired gradation from said first look-up table means, and which uses said conversion table in order to convert said image signal components representing an image having a desired gradation into said secondary image signal components.

3. An apparatus as defined in claim 1 wherein said conversion means comprises:

i) a gradation table storage means which stores information about a plurality of gradation tables, ii) a display compensation means which stores information about a conversion table for the compensation for the gradation characteristics of said display means, iii) a compensation operating means which receives information about a gradation table from said gradation table storage means and receives information about said conversion table from said display compensation means, and which combines said gradation table and said conversion table with each other and generates a conversion table for converting said primary image signal components directly into said secondary image signal components, and iv) a look-up table means which receives information about said conversion table generated by said compensation operating means and receives said primary image signal components, and which uses said conversion table generated by said compensation operating means in order to convert said primary image signal components into said secondary image signal components.

4. An apparatus as defined in claim 1 wherein said medical image is a radiation image stored on a stimulable phosphor sheet.

* * * * *